Aug. 23, 1932.   A. L. V. C. DEBRIE   1,873,742
DEVICE FOR CONTROLLING THE SOFT FOCUS DEVICE
IN CINEMATOGRAPHIC VIEW TAKING APPARATUS
Filed Oct. 20, 1930
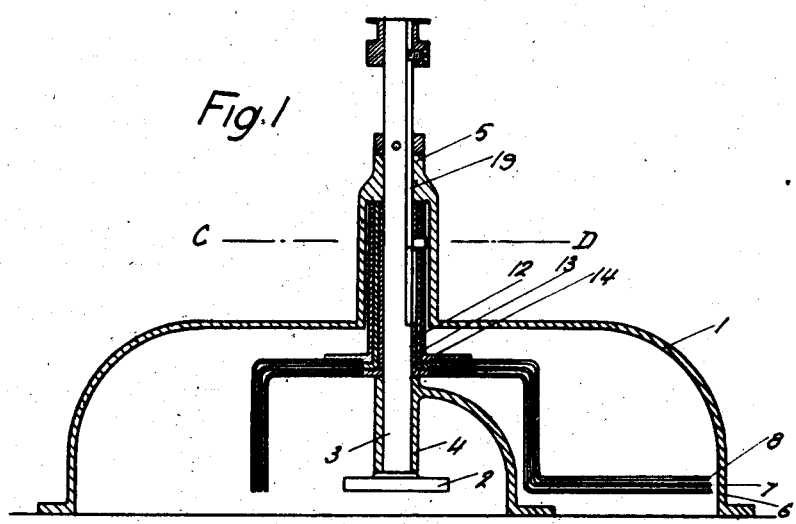
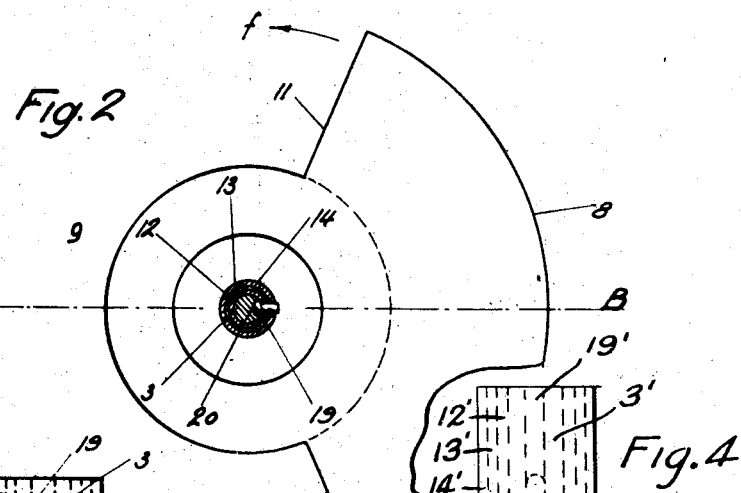
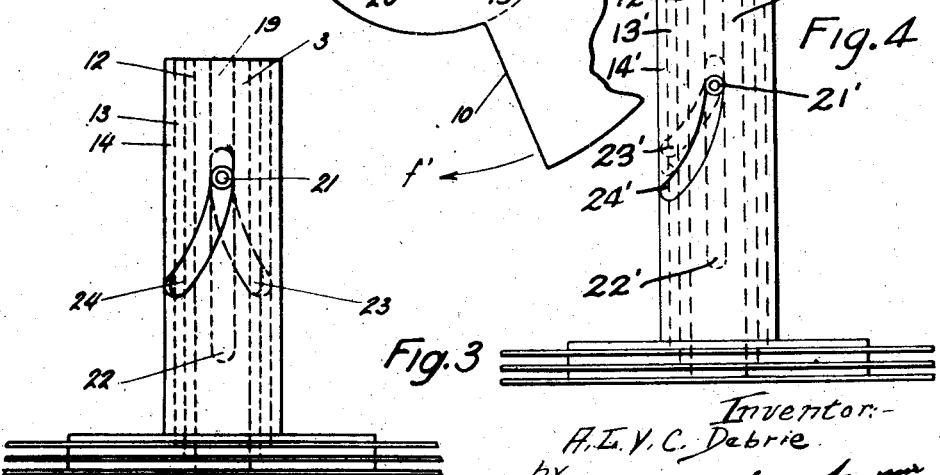

Patented Aug. 23, 1932

1,873,742

UNITED STATES PATENT OFFICE

ANDRÉ LÉON VICTOR CLEMENT DEBRIE, OF PARIS, FRANCE

DEVICE FOR CONTROLLING THE SOFT FOCUS DEVICE IN KINEMATOGRAPHIC VIEW TAKING APPARATUS

Application filed October 20, 1930, Serial No. 490,048, and in France November 16, 1929.

It is known that the so-called soft focus or blurred effects in kinematographic apparatuses are provided by the gradual closure of a shutter formed heretofore by two indentated discs disposed side by side and the relative angular position of which is modified by any suitable means.

My invention has for its object a simple small-sized apparatus for controlling such a shutter formed according to my invention of three or more superposed indentated discs. These discs of common diameter and center have their indentations normally in coincidence; two of these discs may be displaced gradually with reference to the third through equal angles in opposed directions or in the same direction at different angular speeds round the common centre with a view to reducing gradually the part left free by the superposed indentations.

On accompanying drawing given by way of example, Fig. 1 is a cross-section of the device along line AB of Fig. 2.

Fig. 2 is a cross-section along line CD of Fig. 1, the casing being supposed to be removed.

Fig. 3 illustrates a detail of the control device and Fig. 4 shows a modification thereof.

The casing 1 contains the usual plate 2 controlling the film advancing means and carried by the shaft 3 rotatably carried in the bushings 4 and 5. The three superposed shutter sectors 6, 7 and 8 which appear in cross-section as shown in Fig. 1 are provided with equal indentations. These indentations are normally projected together at 9 in Fig. 2 and their edges are projected at 10 and 11. The discs 6, 7, 8 are carried respectively by the sleeves 12, 13, 14 carried concentrically by the shaft 3. The innermost sleeve 12 is borne directly by the shaft 3, the sleeve 13 by the sleeve 12 and the sleeve 14 by the sleeve 13. Each of these sleeves is mounted with slight friction whereby it may rotate without sliding longitudinally over the shaft. The control of the shifting of the discs 7 and 8 with reference to the disc 6 through equal and opposed angles is provided as follows: a key 19 slides in a recess 20 formed in the shaft 3 parallel to the generatrices and carries a tenon 21 engaging grooves 22, 23, 24 formed respectively in the sleeves 12, 13, 14. The groove 22 is rectilinear and parallel to the axis of the shaft 3 and the grooves 23 and 24 are helical and show oppositely directed slopes or as shown in Fig. 4 these slopes may be different and inclined in the same direction.

It is apparent that when the key 19 is displaced the tenon 21 causes the disc 8 to rotate in the direction of the arrow $f$ and the disc 7 to rotate in the direction of the arrow $f'$. The result is that the opening 9 is reduced and therewith the amount of light impressing the film at each exposure. It shows the advantage over devices with a single moving disc that the exposure aperture may be wider than 180°.

Similar devices may be used with 3, 4 or more movable discs when the desired maximum opening of the shutter is 220°, 270°, 300° etc.

What I claim is:

1. In a kinematographic view taking apparatus provided with a film advancing control shaft, the combination of three superposed concentric independent shutter discs extending over an angle somewhat above 120° and three sleeves concentric with the shaft carrying each one of the discs and means for rotating during operation two sleeves with reference to the third for gradually reducing the area left free for exposure.

2. In a kinematographic view taking apparatus provided with a film-advancing control shaft, the combination of three superposed concentric shutter discs extending over an angle somewhat above 120°, a key longitudinally slidable over the control shaft and three coaxial grooved sleeves engaged by said key and carrying each one of the discs, one of the sleeve grooves being parallel to the shaft axis and the two others being helical grooves having equal and opposed pitches.

3. In a kinematographic view taking apparatus provided with a film-advancing control shaft, the combination of three superposed concentric shutter discs extending over an angle somewhat above 120°, a key longitudinally slidable over the control shaft and three coaxial grooved sleeves engaged by said key and carrying each one of the discs, one of the sleeve grooves being parallel to the shaft axis and the two others being helical grooves having different pitches inclined in the same direction.

In testimony whereof I have signed my name to this specification.

ANDRÉ LÉON VICTOR CLEMENT DEBRIE.